3,247,195
SYNTHETIC ZEOLITE AND METHOD FOR
PREPARING THE SAME
George T. Kerr, Trenton, N.J., assignor to Socony Mobil
Oil Company, Inc., a corporation of New York
No Drawing. Filed Jan. 4, 1965, Ser. No. 423,346
14 Claims. (Cl. 260—242)

This application is a continuation-in-part of application Serial Number 174,718, filed February 2, 1962, now abandoned.

This invention relates to a new synthetic zeolite and to a method for preparing the same.

Crystalline aluminosilicate zeolites structurally consist basically of an open three-dimensional framework of $SiO_4$ and $AlO_4$ tetrahedra. Such tetrahedra are cross linked by the sharing of oxygen atoms, so that the ratio of oxygen atoms to the total of the aluminum and silicon atoms is equal to two. The negative electrovalence of tetrahedra containing aluminum is balanced by the inclusion within the crystal of cations, such as alkali or alkaline earth metal ions.

Many zeolites possess a crystal structure, having channels of molecular dimensions. The interstitial spaces are generally originally occupied by water of hydration. After at least partial dehydration, these zeolites may be utilized as efficient adsorbents whereby adsorbate molecules are retained within the interstitial spaces. The interstitial dimensions of openings in the crystal lattice limit the size and shape of the molecules that can be adsorbed. A separation of a mixture of various molecules, based upon molecular dimensions, wherein certain molecules are adsorbed by the zeolite while others are excluded from admission is therefore possible. It is such characteristic of many crystalline zeolites that has led to their designation as "molecular sieves."

A number of synthetic crystalline zeolites have previously been prepared. They are distinguishable from each other and from naturally occurring zeolites on the basis of composition, crystal structure and adsorption properties. The existence of a number of zeolites having similar but distinguishable properties advantageously permits the selection of a particular member having optimum properties for a particular use.

Thus, it has heretofore been known to prepare a synthetic zeolite known as "zeolite X." Such material and preparation thereof has been described in U.S. 2,882,244. Another synthetic zeolite known as "zeolite A" has been described in U.S. 2,882,243. This latter zeolite is initially obtained in its sodium form, i.e. as a sodium aluminosilicate. Such material is capable of effectively sorbing water and straight chain compounds of three or less carbon atoms such as methane, ethane, n-propane, methanol, ethanol, n-propanol and the like. Sodium zeolite A, however, is incapable of adsorbing, to an appreciable extent, straight chain compounds having more than three atoms in the chain. Thus, it is only after replacement, by ion exchange, of a substantial proportion of the sodium ions of the initially obtained sodium zeolite A with divalent ions, such as calcium or magnesium that the pore characteristics thereof are such as to effect separation of straight chain hydrocarbons of more than 3 carbon atoms from admixture with branch chain or cyclic compounds. Sodium zeolite A, known commercially as Molecular Sieve 4A, is thus incapable of admitting into its crystalline structure molecules for which the maximum dimension of the minimum projected cross-section is greater than about 4.9 Angstroms. In order to produce a zeolite A capable of effecting separation of mixtures of straight chain and branched chain molecules or for separation of straight chain molecules from cyclic compounds having four or more atoms, it has heretofore been necessary to first carry out exchange of the initially obtained sodium zeolite A with another ion, such as calcium or magnesium, and to thereby effect exchange of the sodium ion to the extent of at least about 40 percent with such substituting ion. The resulting product, in which calcium is the introduced ion, is known commercially as Molecular Sieve 5A. This zeolite has larger pore dimensions than does the 4A sieve and permits adsorption of molecules for which the maximum dimension of the minimum projected cross-section is about 5.5 Angstroms.

In accordance with the present invention, there is provided a new zeolite which essentially in its sodium form, the form in which the zeolite is obtained from the preparative reaction mixtures, is capable of accomplishing separation of straight chain molecules having more than three atoms in the chain from non-straight chain, i.e. from branched chain and/or cyclic, molecules of more than three atoms without the necessity of converting such form zeolite into another ionic form by prior base exchange such as has heretofore been essential in achieving a synthetic zeolite of the above requisite pore characteristics. The new zeolite, so provided, is hereinafter referred to as "zeolite ZK–5."

The composition of zeolite ZK–5 can stoichiometrically be expressed, in terms of mole ratios of oxides as follows: 0.3 to 0.7 $R_{2/m}$:0.3 to 0.7 $M_{2/n}$:1 $Al_2O_3$:4.0 to 6.0 $SiO_2 \cdot YH_2O$ where R is selected from the group consisting of a nitrogen-containing cation derived from N,N'-dimethyltriethylenediammonium ion and mixtures of said cation with hydrogen and m is the valence thereof; M is a metal and n the valence thereof and Y is any value from about 6 to about 10, said material being capable of selectively adsorbing straight chain hydrocarbons of more than three carbon atoms from admixture of the same with non-straight chain hydrocarbons when M is sodium. Minor variations in the mole ratios of these oxides within the range indicated by the above formula do not significantly change the crystal structure or physical properties of the zeolite.

In one embodiment, the present invention is directed to a crystalline synthetic material having the composition: 0.3 to 0.7 $R_{2/m}O$:0.3 to 0.7 $Na_2O$:1 $Al_2O_3$:4.0 to 6.0 $SiO_2 \cdot YH_2O$ where R, m and Y have the above designated significance and which material is capable of selectively sorbing straight chain hydrocarbons of more than three carbon atoms from admixture of the same with non-straight chain hydrocarbons.

In still another embodiment, the invention provides for a crystalline synthetic material having the composition:

$$0.3 \text{ to } 0.7 \text{ } T_{2/m}O:0.3 \text{ to } 0.7 M_{2/n}O:1Al_2O_3:4.0 \text{ to } 6.0SiO_2 \cdot YH_2O$$

where m, M, n and Y have the above designated significance and T is a nitrogen-containing cation and preferably an ammonium-containing cation derived from N,N'-dimethyltriethylenediammonium ion.

The nitrogen-containing cation is introduced upon crystallization of zeolite ZK–5 from a reaction mixture containing N,N'-dimethyltriethylenediammonium ion. Upon thermal activation of the product, i.e. by heating in an inert atmosphere at a temperature in the approximate range of 200 to 600° C., the nitrogen-containing cation undergoes degradation to hydrogen ion.

It is a particular embodiment of the present invention that zeolite ZK–5 is prepared from reaction mixtures containing a N,N'-dimethyltriethylenediammonium ion and more specifically, by heating in an aqueous solution a mixture of the oxides of materials whose chemical compositions can be completely represented as mixtures of the oxides of $Na_2O$, $Al_2O_3$, $[(CH_3)_2(CH_2CH_2)_3N_2]O$, $SiO_2$ and $H_2O$ suitably at a temperature of about 100° C. for periods of time ranging from 2 hours to 250 hours or longer. The composition of the reaction mixture, expressed in terms of mole ratios of oxides, preferably falls within the following ranges:

$$SiO_2/Al_2O_3$$

of from about 2.5 to 15, $$\frac{Na_2O}{Na_2O + C_8H_{18}N_2O}$$

of from about 0.01 to .25, $$\frac{H_2O}{Na_2O + C_8H_{18}N_2O}$$

of from about 25 to 50, $$\frac{Na_2O + C_8H_{18}N_2O}{SiO_2}$$

of from about 1 to 2.

The product which crystallizes from the hot reaction mixture is separated, suitably by centrifuging or filtration, washed with water until the effluent wash water in equilibrium with the zeolite has a pH of from about 8 to about 12. The material, so obtained, is thereafter activated by heating in an inert atmosphere and preferably air or an oxygen-containing gas at a temperature in the approximate range of 200 to 600° C.

In making zeolite ZK–5, the usual method comprises reacting, in aqueous media, sodium aluminate with 1,4-dimethyl-1,4-diazoniabicyclo[2.2.2]octane silicate. The reaction is carried out in a suitable vessel made, for example, of metal or glass and capable of closure to prevent loss of water. The reaction mixture is initially continuously or periodically stirred to insure homogeneity. After this mixing, agitation may be stopped as it is unnecessary to agitate the reaction mass during the formation and crystallization of the zeolite, although mixing during such latter stages has not been found to be detrimental.

The crystallization procedures can be satisfactorily carried out at temperatures within the range of from about 90° C. to about 120° C., the pressure being atmospheric or at least that corresponding to the vapor pressure of water in equilibrium with the mixture of reactants. While temperatures as low as about 20° C. may be employed, such lower temperatures require a long reaction period. Preferably, a temperature of about 95° C. to 100° C. is employed. Heating is continued until the desired crystalline zeolite product is formed. The zeolite crystals are then separated from the mother liquor and washed, preferably with distilled water, until the effluent wash water in equilibrium with the product has a pH of between about 8 and about 12.

For satisfactory use as an adsorbent, zeolite ZK–5 should be activated by at least partial dehydration. Such activation can be effected, for example, by heating the zeolite to temperatures within the approximate range of 200 to 600° C. in an inert atmosphere, and preferably air under atmospheric or reduced pressure, or by maintaining the zeolite at room temperature under vacuum.

In the synthesis of zeolite ZK–5, it has been found that the composition of the reaction mixture is critical. Specifically, the presence in such mixture of N,N'-dimethyltriethylenediammonium ions has been found to be essential for the production of zeolite ZK–5. In the absence of such ions, no zeolite ZK–5 was obtained. The crystallization temperature and the length of time the crystallization temperature is maintained are important variables in determining the yield of crystalline material. Under some conditions, for example, too low a temperature for too short a time, no crystalline product is realized. Extreme conditions may also result in formation of materials other than zeolite ZK–5. The addition of seeds of previously formed crystals of zeolite ZK–5 to the reaction mixture has been found to enhance the rate of crystallization.

The resulting crystalline synthetic aluminosilicate is one having the negative electrovalence of the aluminosilicate balanced by a cation consisting essentially of a metal such as sodium and a nitrogen-containing cation derived from N,N'-dimethyltriethylenediammonium ion, which zeolite is further characterized by a uniform effective pore diameter of about 5.5 Angstroms.

Sodium oxide present in the reaction mixture is derived from sodium aluminate. The 1,4-dimethyl-1,4-diazoniabicyclo[2.2.2]octane silicate (N,N'-dimethyltriethylenediammonium silicate) solution employed is suitably prepared by dissolving silica gel in a solution of 1,4-dimethyl-1,4-diazoniabicyclo[2.2.2]octane dihydroxide. In place of silica gel, other sources of silica may be employed, for example hydrosols of silica, silicate esters, silica aerogels and freshly prepared, low molecular weight silicic acids. The above dihydroxide may be prepared in any suitable manner. Generally, it is prepared by complete methylation of 1,4-diazoniabicyclo[2.2.2]octane, also known as triethylenediamine, with methyl iodide to yield 1,4-dimethyl-1,4-diazoniabicyclo[2.2.2]octane diiodide which upon subsequent reaction with silver hydroxide is converted to the dihydroxide.

There are critical distinctions in the composition and sorption characteristics of zeolite ZK–5 and zeolite A. Zeolite ZK–5 contains more silicon and less sodium and aluminum than zeolite A. A striking difference in the sorptive properties of these two zeolites has been observed. The following table summarizes the differences in chemical and physical properties observed for the two zeolites:

|  | Mol Percent | | | Lattice Parameter, A. | Sorption, Grams per 100 grams Zeolite | | | |
| --- | --- | --- | --- | --- | --- | --- | --- | --- |
|  | $Na_2O$ | $Al_2O_3$ | $SiO_2$ |  | $H_2O$ | $n-C_6H_{14}$ | Cyclohexane | 3-Methyl-Pentane |
| Zeolite 4A | 25 | 25 | 50 | 12.32±.02 | 24 | <1 | <1 | <1 |
| Zeolite ZK–5 | 6–12 | 15–18 | 65–80 | 18.68±0.2 | 19–24 | 11–14 | <2 | <1 |

It will be seen from the foregoing that while both zeolite 4A and zeolite ZK–5 possessed good sorption characteristics for water and the property of excluding cyclohexane and 3-methylpentane, there was a marked difference in the sorption characteristics of the two zeolites as regards the sorption of n-hexane. Thus, while zeolite 4A was incapable of sorbing n-hexane to any appreciable extent, zeolite ZK–5 exhibited good sorption characteristics for this straight chain hydrocarbon while excluding a branch chain hydrocarbon (3-methylpentane) and a cyclic hydrocarbon (cyclohexane). Such selective sorption characteristic is extremely valuable in effecting separation of straight chain hydrocarbons from a mixture thereof with branch chain or cyclic hydrocarbons, such as occurs in petroleum and obviates the heretofore necessity of replacing the initially formed sodium ions of zeolite A with at least about 40 percent of calcium ions in order to provide an adsorbent with the above-noted sorption characteristics.

In addition to the adsorption characteristics, the rejection characteristics of zeolite ZK–5 are important. The interstitial channels of this zeolite are such that at their narrowest points, molecules with critical dimensions greater than about 5.5 Angstroms will not readily enter into the channels. Accordingly, molecules having critical dimensions greater than approximately 5.5 Angstroms will be rejected by the zeolite, while those having smaller critical dimensions will be adsorbed.

Zeolite ZK–5 may be used as an adsorbent for purposes indicated above in any suitable form. For example, a column of powder crystalline material may afford excellent results as may a pelleted form obtained by pressing into pellets a mixture of zeolite ZK–5 and a suitable bonding agent, such as clay. Also, zeolite ZK–5 may be contained in a matrix of inorganic oxide gel resulting, for example, from intimate admixture of the zeolite, in finely divided form, with an inorganic oxide hydrogel or dispersion in an inorganic oxide hydrosol, followed by gelation of the resulting hydrosol. The composite so prepared may be formed into particles of desired size and shape by well known techniques, for example, spheroidal particles of gel having contained therein and distributed throughout the finely divided zeolite. The inorganic oxide gel may be silica, alumina, magnesia, zirconia, titania and the like or combinations of two or more of such oxides.

The adsorbents contemplated herein include not only the sodium form of zeolite ZK–5, as synthesized above, with sodium as the exchangeable cation but also crystalline materials obtained from such a zeolite by partial or complete replacement of the sodium ion with other cations. The sodium cations can be replaced, at least in part, by other ions including monovalent or divalent cations, such as lithium and magnesium, metal ions in Group I of the Periodic Table such as potassium and silver; Group II metal ions such as calcium and strontium; metal ions of the transition metals such as nickel, the rare earth metals such as cerium, lanthanum, praseodymium, neodymium, samarium and mixtures thereof with each other and the other rare earths; and other ions, for example, hydrogen and ammonium which behave in zeolite ZK–5 as metals in that they can replace metal ions without causing any appreciable change in the basic structure of the zeolite crystal. The transition metals are those whose atomic numbers are from 21 to 28, from 39 to 46 and from 72 to 78 inclusive, namely scandium, titanium, vanadium, chromium, manganese, iron, cobalt, nickel, yttrium, zirconium, niobium, molybdenum, ruthenium, rhodium, palladium, hafnium, tantalum, tungsten, rhenium, osmium and iridium, and platinum.

Ion exchange of the sodium form of zeolite ZK–5 may be accomplished by conventional methods. A preferred continuous method is to pack zeolite ZK–5 into a series of vertical columns and successively pass through the beds a water solution of a soluble salt of the cation to be introduced into the zeolite; and change the flow from the first bed to the second bed as the zeolite in the first bed becomes ion exchanged to the desired extent. The spatial arrangement of the aluminum, silicon and oxygen atoms which make up the basic crystal lattice of the zeolite remains essentially unchanged by partial or complete substitution of the sodium ion by other cations.

In identification of zeolites, the X-ray powder diffraction pattern has been found useful. X-ray diffraction powder patterns of zeolite ZK–5 were obtained utilizing standard techniques. The radiation was the $K_\alpha$ doublet of copper and a Geiger counter spectrometer with a strip chart pen recorder was used. The peak heights, I, and the positions as a function of $2\phi$, where $\phi$ is the Bragg angle, were read from the spectrometer chart. From there, the relative intensities, $$\frac{100 I}{I_0}$$

where $I_0$ is the intensity of the strongest line or peak and $d$ (obs.), the interplanar spacing in A, corresponding to the recorded lines were calculated. X-ray powder diffraction data for zeolite ZK–5 are shown in Table A below:

TABLE A

| hkl | $I/I_0 \times 100$ | d.A. |
|---|---|---|
| 110 | 18 | 13.3 |
| 200 | 100 | 9.41 |
| 220 | 6 | 6.62 |
| 310 | 41 | 5.93 |
| 222 | 48 | 5.41 |
| 321 | 2 | 5.03 |
| 400 | 6 | 4.69 |
| 330 | 50 | 4.41 |
| 420 | 34 | 4.19 |
| 332 | 22 | 3.98 |
| 422 | 18 | 3.81 |
| 510 | 6 | 3.66 |
| 521 | 13 | 3.41 |
| 530, 433 | 35 | 3.21 |
| 611 | 28 | 3.02 |
| 620 | 21 | 2.94 |
| 541 | 2 | 2.88 |
| 622 | 26 | 2.81 |
| 631 | 9 | 2.75 |
| 543, 710, 550 | 11 | 2.64 |
| 640 | 2 | 2.59 |
| 721, 633, 552 | 9 | 2.54 |
| 730 | 3 | 2.45 |
| 732, 651 | 1 | 2.37 |
| 811, 741, 554 | 2 | 2.30 |
| 822, 660 | 3 | 2.20 |
| 831, 750, 743 | 2 | 2.17 |
| 662 | 1 | 2.14 |
| 910, 833 | 3 | 2.06 |
| 842 | 2 | 2.04 |
| 921, 761, 655 | 3 | 2.02 |
| 830, 851, 754 | 1/2 | 1.97 |
| 932, 763 | 2 | 1.93 |
| 941, 853, 770 | 2 | 1.89 |
| 10, 00, 860 | 5 | 1.87 |
| 10, 2, 0, 862 | 5 | 1.83 |
| 10, 3, 1, 952, 765 | 5 | 1.79 |

The following examples will serve to illustrate the present invention without limiting the same:

*Example 1*

Methyl iodide in the amount of 410 grams (2.88 moles) was placed in a 1 liter three-neck, round bottom flask fitted with a stirrer, reflux condenser and drop funnel. The flask was immersed in ice water and there was added over a one hour period, through the funnel, a solution of 148.4 grams (1.32 mole) of triethylenediamine dissolved in 400 milliliters of absolute alcohol. A solid product separted from the reaction mixture during the reaction. The mixture was then stirred for 0.5 hour at room temperature of approximately 27° C. Thereafter, 10 additional grams of methyl iodide were introduced into the mixture and the latter was stirred at reflux temperature of approximately 78° C. on a steam bath for 0.5 hour. Excess methyl iodide and alcohol were then evaporated from the flask. The residual solid product was collected on a Buckner funnel and washed with absolute ethanol. After recrystallization from a water-ethanol mixture and air-drying, a sample of the crystalline product was analyzed and found to be 1,4-dimethyl-1,4-diazoniabicyclo[2.2.2]octane diiodide, characterized by the formula:

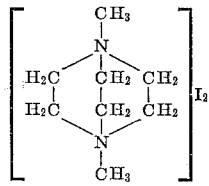

The above compound was next converted to the dihydroxide as shown in the following example:

*Example 2*

Silver hydroxide was prepared by reacting a solution of 200 grams of silver nitrate dissolved in 500 ml. of water with a solution of 50 grams of sodium hydroxide dissolved in 300 ml. of water. A precipitate of silver hydroxide formed and was collected on a funnel and washed with water to remove excess sodium hydroxide. The moist silver hydroxide, 200 ml. of water and 191 grams of 1,4-dimethyl-1,4-diazoniabicyclo[2.2.2]octane diiodide, prepared as in Example 1, were placed in a 1 liter ball mill and rotated for 3 hours.

The resulting reaction mixture was filtered through a sintered disc filter funnel and the residue in the funnel was washed with about 200 ml. of water. The colorless filtrate was found by filtration to be approximately 2N solution as a base. The solution was evaporated under vacuum to increase the concentration. When the volume was reduced sufficiently to yield about a 3 N solution, the mixture was filtered through a sintered filter funnel. The resulting clear, colorless filtrate was a solution of 1,4-dimethyl-1,4-diazoniabicyclo[2.2.2]octane dihydroxide.

A solution containing silicate nad 1,4-dimethyl-1,4-diazonibiccyclo[2.2.2]octane ions was prepared by dissolving silica gel in the above dihydroxide solution in accordance with the following equation:

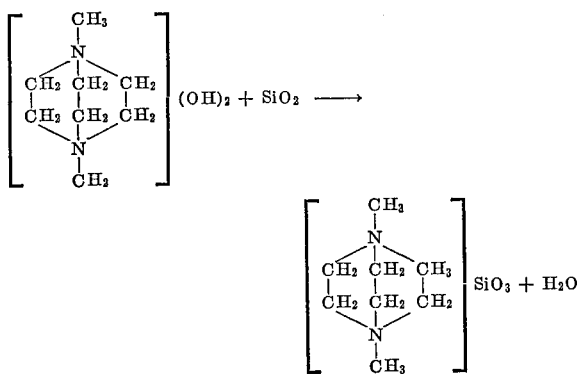

Such was accomplished in accordance with he following example:

Example 3

Silica gel in the amount of 9.2 grams was dissolved with gentle heating in 102 ml. of 2.99 N solution of 1,4-dimethyl - 1,4 - diazoniabicyclo[2.2.2]octane dihydroxide, prepared as in Example 2. The resulting solution was filtered. The filtrate was a solution of 1,4-dimethyl-1,4-diazoniabicyclo[2.2.2]octane silicate.

The latter solution was used in preparation of the new synthetic zeolite described hereinabove in accordance with the following example:

Example 4

A solution of 3.45 grams of sodium aluminate in 10 ml. of water was placed in a mixing vessel. The solution of 1,4-dimethyl-1,4-diazoniabicyclo[2.2.2]octane disilicate solution, prepared as in Example 3, was diluted to 122 ml. total volume and added rapidly to the aluminate solution.

The composition of the resulting reaction mixture expressed in the form of oxides was as follows:

| | Mol percent |
|---|---|
| $Na_2O$ | 5.9 |
| 1,4 - dimethyl - 1,4 - diazoniabicyclo[2.2.2]octane oxide | 45.0 |
| $Al_2O_3$ | 4.0 |
| $SiO_2$ | 45.1 |

A light gel immediately formed. The mixture was heated for 8 days at 95–100° C. and samples of the mixture were examined daily to ascertain the degree of crystallization which had occurred. After five days, the degree of crystallinity did not appear to change.

The resulting solid crystalline product was collected on a filter, washed with water and purged with air at 350° C. A grayish solid was obtained having the following sorptive capacities:

| | Grams sorbed per 100 grams of sample |
|---|---|
| Water | 19.34 |
| Cyclohexane | 1.82 |
| n-Hexane | 11.84 |

The zeolite product, upon analysis, showed the following composition:

| | Wt. percent | Mol percent |
|---|---|---|
| $Na_2O$ | 7.0 | 7.7 |
| $Al_2O_3$ | 24.2 | 16.1 |
| $SiO_2$ | 67.3 | 76.2 |

X-ray diffraction analysis established the product as highly crystalline having the X-ray powder diffraction pattern set forth hereinabove in Table A.

The new zeolite having the above composition and X-ray diffraction pattern was designated as zeolite ZK-5.

Example 5

A reaction was conducted in the same manner and with the same reactants as described in Example 4 except that the disilicate solution was prepared using 111 ml. of 2.74 N 1,4-dimethyl-1,4-diazoniabicyclo[2.2.2]octane dihydroxide solution. The mixture was heated at 95–100° C. for 9 days and then treated as in Example 4.

Portions of the resulting product were purged with air at 350° C. and 550° C. The former treatment yielded a grayish material whereas the latter treatment yielded a white product. The sorptive capacities of this latter material were as follows:

| | Grams sorbed per 100 grams of sample |
|---|---|
| Water | 20.6 |
| Cyclohexane | 0.9 |
| n-Hexane | 12.7 |

The zeolite product analyzed as follows:

| | Wt. percent | Mol percent |
|---|---|---|
| $Na_2O$ | 7.7 | 8.3 |
| $Al_2O_3$ | 24.5 | 16.1 |
| $SiO_2$ | 67.5 | 75.6 |

X-ray diffraction analysis showed this material to be zeolite ZK-5.

Example 6

A solution of 3.45 grams of sodium aluminate and 0.8 gram of sodium hydroxide in 15 ml. of water was placed in a mixing vessel.

Silica gel in the amount of 9.2 grams was dissolved in 127 ml. of a 3.59 N solution of 1,4-dimethyl-1,4-diazoniabicyclo[2.2.2]octane dihydroxide. The solution so obtained was diluted with water to a total volume of 167 ml. and added to the mixing vessel with stirring. A few milligrams of the zeolite product produced as in Example 5 were added to the reaction mixture to facilitate crystallization.

The composition of the resulting reaction mixture expressed in the form of oxides was as follows:

| | Mol percent |
|---|---|
| $Na_2O$ | 7.1 |
| $C_8H_{18}N_2O$ | 53.6 |
| $Al_2O_3$ | 3.2 |
| $SiO_2$ | 36.0 |

The mixture so prepared was heated at 95–100° C. for 41 hours. The solid product resulting at the end of this time was collected on a Buckner funnel, washed with water and purged with air at 500° C.

The sorptive capacities of the resulting white solid zeolite product were as follows:

|  | Grams sorbed per 100 grams of sample |
|---|---|
| Water | 22.95 |
| Cyclohexane | 1.41 |
| n-Hexane | 12.92 |

The zeolite product analyzed as follows:

|  | Wt. percent | Mol percent |
|---|---|---|
| $Na_2O$ | 9.16 | 10.2 |
| $Al_2O_3$ | 25.8 | 17.4 |
| $SiO_2$ | 63.0 | 72.4 |

X-ray diffraction analysis established this material to be zeolite ZK-5.

The much shorter time required for crystallization as compared with that of Examples 4 and 5 is believed attributable to the presence of added zeolite product at the beginning of the reaction.

Example 7

A reaction was conducted in the same manner and with the same reactants as described in Example 5 except on a scale 2.7 times that of such previous example. The reaction mixture so obtained was maintained at 95-100° C. for eight days before crystallization was complete.

The product was purged at 350° C. with air. It possessed the following sorptive capacities:

|  | Grams sorbed per 100 gram sample |
|---|---|
| Water | 20.66 |
| Cyclohexane | 1.44 |
| n-Hexane | 13.80 |

The composition of this material, identified as zeolite ZK-5 by X-ray diffraction, was as follows:

|  | Wt. percent | Mol percent |
|---|---|---|
| $Na_2O$ | 5.8 | 6.2 |
| $Al_2O_3$ | 24.5 | 16.0 |
| $SiO_2$ | 70.3 | 77.8 |

Example 8

A solution of 4.4 grams of sodium aluminate in 6 ml. of water was placed in a mixing vessel. To this was added with stirring 61 ml. of a 2.35 N 1,4-dimethyl-1,4-diazoniabicyclo[2.2.2]octane dihydroxide solution in which had been dissolved 4.13 grams of silica gel. The resulting mixture was heated at 95-100° C. for 72 hours. The solid product which formed was collected, washed and purged with air at 350° C.

The zeolitic product had the following sorptive properties:

|  | Grams sorbed per 100 gram sample |
|---|---|
| Water | 23.96 |
| Cyclohexane | 10.43 |
| n-Hexane | 12.30 |

The zeolite product analyzed as follows:

|  | Wt. percent | Mol percent |
|---|---|---|
| $NaO_2$ | 14.0 | 15.1 |
| $Al_2O_3$ | 275. | 18.8 |
| $SiO_2$ | 56.8 | 66.0 |

X-ray diffraction analysis established this product to be a mixture of zeolite X and zeolite ZK-5. The presence of zeolite X is not unexpected since the reaction analyzing as follows:

|  | Mol percent |
|---|---|
| $Na_2O$ | 13.9 |
| $C_8H_{18}N_2O$ | 38.4 |
| $Al_2O_3$ | 9.4 |
| $SiO_2$ | 38.4 | had a silica/alumina mole ratio of 4.1, which is the same as that present in reaction mixtures used for preparing zeolite X.

The sodium ion in zeolite ZK-5 can be replaced with ammonium ion and the latter thermally decomposed to yield ammonia gas and a hydrogen or acid zeolite as shown by the following example:

Example 9

A sample of zeolite ZK-5, prepared as described in Example 5, was rinsed with concentrated ammonium hydroxide followed by 250 ml. of saturated ammonium chloride solution. The zeolite was then washed with water until free of chloride ion. The resulting material, after purging at 350° C. was found to contain 0.64 wt. percent $Na_2O$ as compared with 7.7 wt. percent $Na_2O$ in the original zeolite. This product had the following sorptive properties:

|  | Grams sorbed per 100 gram sample |
|---|---|
| Water | 21.00 |
| Cyclohexane | 1.31 |
| n-Hexane | 12.00 |

A portion of this acid zeolite was wetted with water and repurged at 350° C. It possessed the following sorptive capacities:

|  | Grams sorbed per 100 gram sample |
|---|---|
| Cyclohexane | 1.61 |
| n-Hexane | 13.62 |

The above sorption data show that zeolite ZK-5 in the acid form is stable in water.

It is to be understood that the above description is merely illustrative of preferred embodiments of the invention of which many variations may be made by those skilled in the art without departing from the spirit thereof.

I claim:

1. A crystalline synthetic material having the composition:

$$0.3 \text{ to } 0.7 \ R_{2/m}O : 0.3 \text{ to } 0.7 \ M_{2/n}O : 1 \ Al_2O_3 : 4.0 \text{ to } 6.0 \ SiO_2 \cdot YH_2O$$

where R is selected from the group consisting of a nitrogen-containing cation derived from N,N'-dimethyltriethylenediammonium ion and mixtures of said cation with hydrogen and $m$ is the valence thereof; M is a metal and $n$ the valence thereof and Y is any value from about 6 to about 10, said material being capable of selectively adsorbing straight chain hydrocarbons of more than three carbon atoms from admixture of the same with non-straight chain hydrocarbons when M is sodium.

2. A crystalline synthetic material having the composition:

$$0.3 \text{ to } 0.7 \ R_{2/m}O : 0.3 \text{ to } 0.7 \ Na_2O : 1 \ Al_2O_3 : 4.0 \text{ to } 6.0 \ SiO_2 \cdot YH_2O$$

where R is selected from the group consisting of a nitrogen-containing cation derived from N,N'-dimethyltriethylenediammonium ion and mixtures of said cation with hydrogen and $m$ is the valence thereof and Y is any value from about 6 to about 10, said material being capable of selectively sorbing straight chain hydrocarbons of more than three carbon atoms from admixture of the same with non-straight chain hydrocarbons.

3. A crystalline synthetic material having the composition:

$$0.3 \text{ to } 0.7 \ T_{2/m}O : 0.3 \text{ to } 0.7 \ M_{2/n}O : 1 \ Al_2O_3 : 4.0 \text{ to } 6.0 \ SiO_2 \cdot YH_2O$$

where T is a nitrogen-containing cation derived from N, N'-dimethyltriethylenediammonium ion and m is the valence thereof; M is a metal and n the valence thereof and Y is any value from about 6 to 10.

4. A crystalline synthetic material having a composition expressed in terms of oxides as follows:

0.3 to 0.7 $T_{2/m}O$:0.3 to 0.7 $Na_2O$:1 $Al_2O_3$:4.0 to 6.0 $SiO_2 \cdot YH_2O$ where T is a nitrogen-containing cation derived from N, N'-dimethyltriethylenediammonium ion and m is the valence thereof and Y is any value from about 6 to about 10, said material being characterized by a structure having uniform effective pore dimensions of about 5.5 Angstroms in diameter.

5. A method for synthesizing a crystalline material which comprises preparing a reaction mixture whose composition expressed in terms of oxide mole ratios falls within the following ranges:

$$SiO_2/Al_2O_3$$

of from about 2.5 to about 15, $$\frac{Na_2O}{Na_2O+C_8H_{18}N_2O}$$

of from about 0.01 to about .25, $$\frac{H_2O}{Na_2O+C_8H_{18}N_2O}$$

of from about 25 to about 50, $$\frac{Na_2O+C_8H_{18}N_2O}{SiO_2}$$

of from about 1 to about 2, and maintaining said mixture at a temperature within the range from about 20 to about 120° C. until said crystalline material is formed.

6. A method for synthesizing a crystalline material which comprises preparing a reaction mixture whose composition expressed in terms of oxide mole ratios falls within the following ranges:

$$SiO_2/Al_2O_3$$

of from about 2.5 to about 15, $$\frac{Na_2O}{Na_2O+C_8H_{18}N_2O}$$

of from about 0.01 to about .25, $$\frac{H_2O}{Na_2O+C_8H_{18}N_2O}$$

of from about 25 to about 50, $$\frac{Na_2O+C_8H_{18}N_2O}{SiO_2}$$

of from about 1 to about 2, and maintaining said mixture at a temperature within the range from about 90 to about 120° C. until said crystalline material is formed.

7. A method for synthesizing a crystalling aluminosilicate zeolite which comprises preparing a reaction mixture whose composition expressed in terms of oxide mole ratios falls within the following ranges:

$$SiO_2/Al_2O_3$$

of from about 2.5 to about 15, $$\frac{Na_2O}{Na_2O+C_8H_{18}N_2O}$$

of from about 0.01 to about .25, $$\frac{H_2O}{Na_2O+C_8H_{18}N_2O}$$

of from about 25 to about 50, $$\frac{Na_2O+C_8H_{18}N_2O}{SiO_2}$$

of from about 1 to about 2, maintaining said mixture at a temperature within the approximate range of 20° C. to 120° C. until crystals of said zeolite are formed, separating the crystals from the mother liquor, and subjecting the separated crystals to an activation treatment by heating at a temperature in the approximate range of 200 to 600° C.

8. A method for synthesizing a crystalline aluminosilicate zeolite which comprises reacting, in aqueous media, sodium aluminate and 1,4-dimethyl-1,4-diazoniabicyclo[2.2.2]octane silicate, the resulting reaction mixture having a composition expressed in terms of oxide mole ratios within the following ranges:

$$SiO_2/Al_2O_3$$

of from about 2.5 to about 15, $$\frac{Na_2O}{Na_2O+C_8H_{18}N_2O}$$

of from about 0.01 to about .25, $$\frac{H_2O}{Na_2O+C_8H_{18}N_2O}$$

of from about 25 to about 50, $$\frac{Na_2O+C_8H_{18}N_2O}{SiO_2}$$

of from about 1 to about 2, maintaining said mixture at a temperature within the approximate range of 90° C. to 120° C. until crystals of said zeolite are formed, separating the crystals from the mother liquor and subjecting the separated crystals to an activation treatment by heating at a temperature in the approximate range of 200 to 600° C.

9. The composition of claim 1 admixed with a clay bonding agent.

10. The composition of claim 1 contained in an inorganic oxide gel matrix.

11. The composition of claim 1 wherein at least a portion of the metal is replaced with ions selected from the group consisting of hydrogen and ammonium.

12. The composition of claim 2 wherein at least a portion of the sodium is replaced with ions selected from the group consisting of hydrogen and ammonium.

13. A method for synthesizing a crystalline material which comprises preparing a reaction mixture whose composition expressed in terms of oxide mole ratios falls within the following ranges:

$$SiO_2/Al_2O_3$$

of from about 2.5 to about 15, $$\frac{Na_2O}{Na_2O+C_8H_{18}N_2O}$$

of from about 0.01 to about .25, $$\frac{H_2O}{Na_2O+C_8H_{18}N_2O}$$

of from about 25 to about 50, $$\frac{Na_2O+C_8H_{18}N_2O}{SiO_2}$$

of from about 1 to about 2, said mixture containing as seed previously formed crystals of said material and maintaining said mixture at a temperature within the range from about 20 to about 120° C. at least until further quantity of said crystalline material is formed.

14. A method for synthesizing a crystalline material which comprises preparing a reaction mixture whose composition expressed in terms of oxide mole ratios falls within the following ranges:

$$SiO_2/Al_2O_3$$

of from about 2.5 to about 15, $$\frac{Na_2O}{Na_2O+C_8H_{18}N_2O}$$

of from about 0.01 to about .25, $$\frac{H_2O}{Na_2O+C_8H_{18}N_2O}$$

of from about 25 to about 50, $$\frac{Na_2O+C_8H_{18}N_2O}{SiO_2}$$

of from about 1 to about 2, maintaining said mixture at a temperature within the range from about 20 to about 120° C. until said crystalline material is formed, separating the crystals from the mother liquor, contacting the resulting crystals with an ammonium ion-containing solution and subjecting the crystals so treated to a temperature in the approximate range of 200 to 600° C.

No references cited.

NICHOLAS S. RIZZO, *Primary Examiner.*
HENRY R. JILES, *Examiner.*